US 8,146,960 B2

(12) United States Patent
Dubedout et al.

(10) Patent No.: US 8,146,960 B2
(45) Date of Patent: Apr. 3, 2012

(54) TWO HERMETIC THREADED TUBULAR JOINTS

(75) Inventors: Laurent Dubedout, Valenciennes (FR); Benoît Duquesne, Valenciennes (FR); Eric Verger, Valenciennes (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 701 days.

(21) Appl. No.: 10/580,585

(22) PCT Filed: Nov. 23, 2004

(86) PCT No.: PCT/FR2004/002985
§ 371 (c)(1),
(2), (4) Date: Dec. 20, 2006

(87) PCT Pub. No.: WO2005/064218

PCT Pub. Date: Jul. 14, 2005

(65) Prior Publication Data
US 2007/0176422 A1     Aug. 2, 2007

(30) Foreign Application Priority Data
Nov. 28, 2003   (FR) ...................................... 03 14039

(51) Int. Cl.
*F16L 13/14*     (2006.01)
(52) U.S. Cl. .................... 285/382.2; 285/382.4; 285/334
(58) Field of Classification Search .................. 295/334;
285/334, 333, 382, 382.1, 382.2, 382.4
See application file for complete search history.

(56) References Cited

U.S. PATENT DOCUMENTS

| | | | |
|---|---|---|---|
| 3,467,413 A * | 9/1969 | Madrelle | 285/334 |
| 3,870,351 A * | 3/1975 | Matsuki | 285/334 |
| 4,611,838 A | 9/1986 | Heilmann et al. | |
| 4,943,095 A * | 7/1990 | Sugimura | 285/334 |
| 5,419,595 A * | 5/1995 | Yamamoto et al. | 285/334 |
| 5,462,315 A * | 10/1995 | Klementich | 285/334 |
| 5,687,999 A * | 11/1997 | Lancry et al. | 285/333 |
| 5,769,466 A * | 6/1998 | Noel et al. | 285/332 |

(Continued)

FOREIGN PATENT DOCUMENTS
WO      98/42947      10/1998
(Continued)

OTHER PUBLICATIONS

U.S. Appl. No. 10/580,718, filed May 25, 2006, Dubedout, et al.
U.S. Appl. No. 10/580,607, filed May 25, 2006, Dubedout, et al.
U.S. Appl. No. 13/139,188, filed Jun. 10, 2011, Verger, et al.

*Primary Examiner* — James Hewitt
*Assistant Examiner* — Jay R Ripley
(74) *Attorney, Agent, or Firm* — Oblon, Spivak, McClelland, Maier & Neustadt, L.L.P.

(57) ABSTRACT

An assembly including two symmetrically-disposed expandable threaded tubular joints. The joints including a male tubular element at one end of a tube and equipped with a male thread, a first annular lip having a first axially abutting surface, a first inner surface and a first outer surface, and a second abutting surface; and a female tubular element equipped with a female thread, a second annular lip having a third abutting surface, a second outer surface and a second inner surface, and a third inner surface and a fourth axially abutting surface which, together with the second outer surface, defines an annular housing homologous to the corresponding first lip. The two female tubular elements form two opposing ends of a female/female-type sleeve.

15 Claims, 4 Drawing Sheets

U.S. PATENT DOCUMENTS

| | | | |
|---|---|---|---|
| 5,829,797 A * | 11/1998 | Yamamoto et al. | 285/333 |
| 6,478,344 B2 * | 11/2002 | Pallini et al. | 285/333 |
| 6,607,220 B2 * | 8/2003 | Sivley, IV | 285/334 |
| 2002/0163192 A1 | 11/2002 | Coulon et al. | |
| 2005/0172472 A1 * | 8/2005 | Verger et al. | |

FOREIGN PATENT DOCUMENTS

WO 03/060370 7/2003

* cited by examiner

TWO HERMETIC THREADED TUBULAR JOINTS

The invention relates to the field of tubular joints such as, for example, those used in hydrocarbon wells or similar wells, such as geothermal wells.

These joints are generally used to connect great length tubes together, or else to connect great length tubes and sleeves together (reference therefore being made to the assembly of joints). They thus allow casing or tubing strings to be formed.

Moreover, these joints must be able to withstand considerable bending, tensile, compressive and sometimes torsional stresses, and also considerable pressure variations between the interior and the exterior. Furthermore, these joints must also in some cases be gas-tight. For these reasons, the joints are often of the threaded type and the sleeves and tubes are generally made from steel or from an alloy having a high yield point (possibly obtained by heat treatment). In the case of threaded joints, gas-tightness is most often provided by sealing surfaces with interfering "metal-on-metal"-type contact.

In order to reduce the initial overall size of the tubes and also possibly to allow the drilling of wells having a uniform diameter, it has been proposed, in particular in documents U.S. Pat. No. 6,604,763 and WO 03/071086. forcefully to expand them diametrally in situ by means of an expansion tool known as a "ball". Sealed threaded joints such as, for example, those described in document EP 0488912 are able to withstand such expansion but lose their sealing characteristics during the expansion, the nose at the end of the male element, which carries a male sealing surface, falling toward the axis during the expansion ("banana" effect), and this breaks the seal.

In order to solve this problem, the Applicant proposed, in document WO 02/01102, a threaded tubular joint, the male nose of which is provided at one end with an annular finger fitted in a female groove, the groove providing support for the finger and preventing the male finger from falling toward the axis during the expansion.

However, a threaded joint of this type does not have sufficiently high sealing characteristics when the expansion rate is greater than 10%. The deformations generated by the expansion ball displace, or even eliminate, the contacts between the male finger and the groove, and this displaces the interference contacts between sealing surfaces by reducing or even eliminating them.

The term "interference contact" refers, in the present context, to a contact developing a contact pressure between two contacting surfaces. The higher the contact pressure, the higher the fluid pressure the joint is able to withstand without the seal being broken. In addition to the fluid pressure, which may be exerted inside or outside the threaded joint, axial tensile or compressive loads may modify the contact pressure and therefore the sealing characteristics. In other words, owing to the embodiment of these joints, their seal may not be identical with respect to the internal pressure or the external pressure, nor be stable as a function of the load.

In order to improve the situation, the Applicant proposed, in patent document FR 02/03842 (filed on 27 Mar. 2002 under the internal priority of patent document FR 02/00055, filed on 3 Jan. 2002), a metal/metal tubular sealing joint provided with an annular finger (or lip) described in document WO 02/01102 and having inclined male and female shoulders, highly tightened against one another after expansion, the shoulder on the female element consisting of the flank of a groove and the shoulder on the male element being able to pre-exist or result from the pressing of the male element at the bottom of the groove during the expansion.

This joint was configured to provide a seal at high expansion rates, typically greater than 10%, but its sealing characteristics may prove insufficient if the sealing characteristics required in the various forms of loading are high, in particular in the case of sleeved joints. Said sleeved joints, and the materials from which they are made, must be able to withstand considerable expansion stresses, and controlling the deformation of the bearing surfaces and abutments is rendered difficult, so sufficient tightness to high-pressure gases may not always be provided prior to the expansion phase.

The object of the invention is therefore to improve the situation, in particular in terms of expansion stresses in the case of joints entailing connection sleeves and great length tubes and, in particular, in the presence of very high expansion rates, typically greater than 10%.

The invention therefore proposes an assembly consisting of two expandable threaded tubular joints, disposed symmetrically and each comprising:

on the one hand, a first tubular element arranged at an end of a tube and comprising a first portion, provided with a male thread, and a second portion extending said first portion and comprising i) a first outer surface, ii) a first annular lip having a first axial abutment surface and a first inner surface and delimited by said first outer surface over a portion of the axial length thereof, and iii) a second abutment surface; and on the other hand, a second tubular element comprising i) a female thread, matching the first male thread and screwed thereto, ii) a second annular lip, having a third abutment surface, a second outer surface, capable of being arranged to face said first inner surface, and a second inner surface, and iii) a third inner surface and a fourth axial abutment surface defining with the second outer surface an annular recess matching and receiving the corresponding first lip.

This assembly is characterised by the fact that said second tubular elements form two opposing ends of a female/female-type connection sleeve, separated by a central portion initially provided, over an outer surface, with an annular zone having an initial reduced thickness selected such that the thickness of the sleeve in the region of this zone is greater than or equal to the product of the section of a common portion of said tubes, and the efficiency of the joint, that each second abutment surface rests against the corresponding third abutment surface and/or that each abutment surface rests against the corresponding fourth abutment surface and that the assembly is capable of developing, after diametral expansion in the plastic deformation region, sealing interference contacts sealing the assembly.

The term "common portion of a tube" refers to the central portion remote from its two ends and having a substantially constant diameter.

By reducing the thickness of the sleeve in this way in the region of its central portion, the expansion pressures and forces undergone by the joint are, in particular, reduced and the deformations in the region of the abutments and bearing surfaces may be controlled.

The assembly according to the invention may comprise other characteristics which may be taken individually or in combination, in particular:

the zone of reduced thickness in the form of a dish may be provided with a central portion having the maximum reduced thickness and lateral walls inclined at an angle of less than approximately 30° and preferably equal to approximately 15°.

the dish may extend substantially between the third abutment surfaces of the two second tubular elements or even between the last threads of the two female threads, said second tubular element comprises, at a selected location of its third inner surface, an inner annular groove arranged substantially in the region of said first outer surface, said groove initially comprises at least two curvilinear portions, said curvilinear portions initially have substantially identical radii of curvature, said radius of curvature is initially between approximately 2 mm and approximately 20 mm, the two curvilinear portions are separated by a substantially cylindrical central portion, said groove initially has a radial depth, the maximum value of which is selected such that the material section at the bottom of the groove is greater than the product of the smallest section of a common portion of said tubes, and the efficiency of the joint under tension, said first outer surface and third inner surface are shaped in such a way that, after expansion, a sealing interference contact is defined between a portion of each of them, said first and second tubular elements are shaped in such a way that, after said expansion, a sealing and interference contact is defined between an inner end portion of said first lip and said second outer surface.

The invention also relates to a method for assembling two expanded tubular joints from an initial assembly of the foregoing type.

A method for this type is particularly suitable, although in a non-limiting manner, for the radial expansion of the joint at an expansion rate at least equal to 10%.

Other characteristics and advantages of the invention will become apparent on examining the following detailed description and accompanying drawings, in which.

The accompanying drawings may serve not only to supplement the invention, but also possibly to contribute to the definition thereof.

The invention relates to an assembly of two sealed threaded tubular joints, disposed symmetrically, which may be used, in particular, in a hydrocarbon well or in a similar well such as a geothermal well, and to the associated production method.

As indicated in the introduction, an assembly of two threaded joints may allow casing or tubing strings to be formed, by joining great length metallic tubes via metallic sleeves.

Reference will firstly be made to FIG. 1 to 8 in order to describe an embodiment of an assembly of two threaded joints according to the invention. In this example, as is partially illustrated in FIG. 1, two joints (known as "sleeved" joints) allow the connection of two tubes T1 and T2, having an axis XX generated by revolution and being of great length, i.e. several meters long, via a connection sleeve M. More specifically, each tube T1, T2 comprises a male-type end EM (or male tubular element) intended to be connected to one of the two female-type ends EF (or female tubular elements) of the sleeve M. A joint, in the present context, therefore consists of a male tubular element EM associated with a great length tube T1, T2 and joined to a female tubular element EF associated with a sleeve M, and an assembly therefore consists of two joints separated by the central portion PCM of a sleeve M. In the illustrated embodiment, the tubes T1 and T2 have, for example, a common portion, the initial outer diameter of which is equal to approximately 193.68 mm (or 7⅝"). The common portion of a tube is the central portion remote from its two ends and having a substantially constant diameter.

Figure 1:
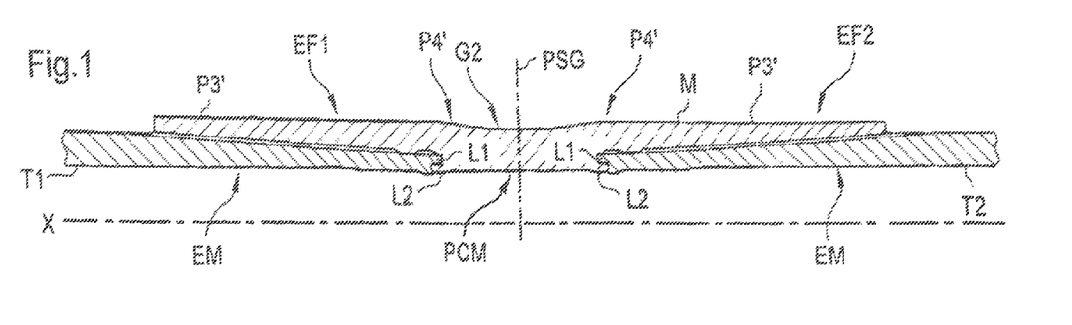
FIG. 1 illustrates schematically, in a longitudinal section, a portion of an embodiment of an assembly of two expandable threaded joints according to the invention, disposed symmetrically.

As is illustrated in FIG. 1, the male end EM of a tube T1, T2 comprises two portions P1 and P2. The first portion P1 extends the central portion of the tube T1, T2 and is provided with an outer male thread FM, preferably conical in type, though it could also be cylindrical in type.

Figure 2:
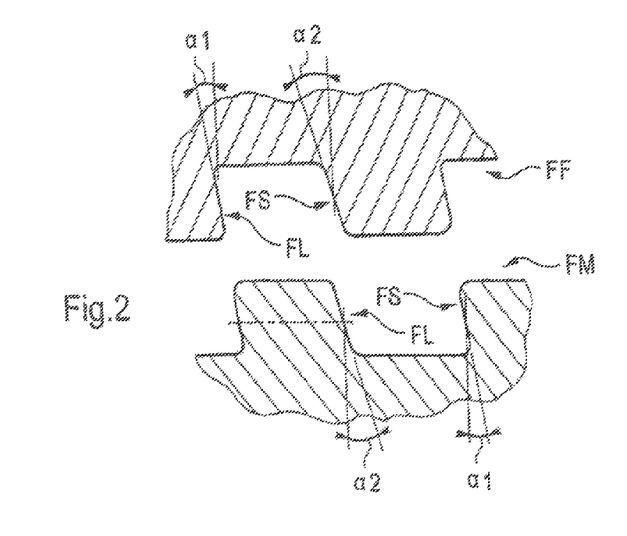
FIG. 2 illustrates schematically, in a longitudinal section, a portion of a female conical thread and of the matching male conical thread prior to screwing and expansion.

For example, as illustrated in FIG. 2, a conical thread is provided, the conicity $\Delta D/D$ of which, where D is the diameter, is 10%. Moreover, the axial (or longitudinal) clearance between the threads is initially sufficiently large to provide them with a specific freedom of displacement during the diametral expansion, to which reference will be made hereinafter. For example, the axial clearance between the stabbing flanks FS of the threads of the male FM and female FF threads is between approximately 0.05 mm and approximately 0.3 mm.

Furthermore, in order to provide good tensile, but especially compressive, resistance and therefore to reduce the risk of disengagement or jumping out of the male and female threads prior to, during and after the expansion, the carrier flank (or "loading flank") FL of the threads is, for example, inclined relative to the radial direction by a negative angle $\alpha 1$ of between approximately $-3°$ and approximately $-15°$ and more preferably equal to approximately $-10°$, whereas the stabbing flank FS of the threads is, for example, inclined relative to the radial direction by a positive angle $\alpha 2$ of between approximately $+10°$ and approximately $+30°$ and more preferably equal to approximately $+15°$.

The negative angle $\alpha 1$ prevents disengagement or jumping out of the engaged threads, in particular under tension. Moreover, the greater the positive angle α2, the easier the engagement of the threads, but the more the compressive resistance is impaired.

It is important to note that the male FM and female FF threads may each be formed over at least one portion of tubular element EM, EF. In other words, they may be in the form of one or more portions. If they consist of two portions, said portions may possibly be formed over two radially separate surfaces or alternatively over a single surface.

Figure 3:
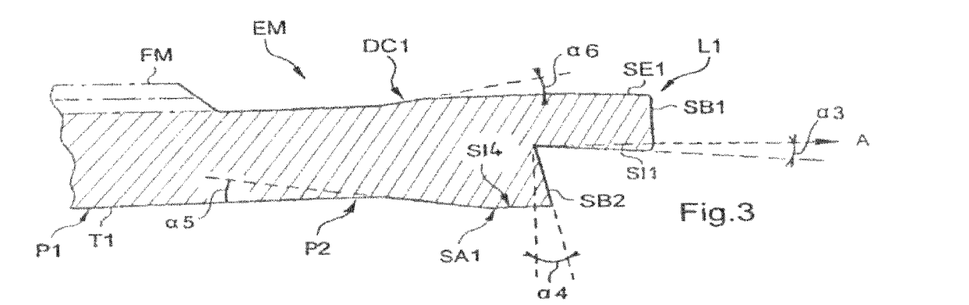
FIG. 3 illustrates schematically, in a longitudinal section, a portion of the male end of a tube of one of the expandable threaded joints of FIG. 1.

The second portion P2 extends the first portion P1 at the end of the tube T1, T2. It comprises, firstly, as illustrated in FIG. 3, a first annular lip (or annular finger) L1 comprising a first axial abutment surface SB1, initially substantially planar and perpendicular to the longitudinal direction A of the tube T1, T2 (parallel to XX), a first inner surface SI1, initially extending in a substantially perpendicular manner the first axial abutment surface SB1 in the direction of the first portion P1 and oriented toward the interior of the tube T1, T2 (i.e. on the side opposing the male thread FM), and a portion of a first outer surface SE1, also extending the first axial abutment surface SB1 in the direction of the first portion P1 and oriented toward the exterior of the tube T1. The first outer surface SE1 of the second portion P2 of the male element EM extends from the first abutment surface SB1 up to the region of the male thread FM. The second portion P2 also comprises a second abutment surface SB2 extending the first inner surface SI1 and extended by a (fourth) at least partially cylindrical inner surface SI4 intended to be in contact with the fluid (or gas) circulating in the tube T1, T2. The first axial abutment surface SB1, first inner surface SI1 and second abutment surface SB2 define what a person skilled in the art calls a "male rebate".

As is illustrated in FIG. 3, the first inner surface SI1 may be inclined by a selected angle α3 relative to the longitudinal direction A of the tube T1, T2, for a reason which will be referred to hereinafter. It thus initially forms a conical surface. The angle of inclination is preferably between approximately 0.1° and approximately 15° and is more preferably equal to approximately 2.5°. Moreover, as shown, the first outer surface SE1 may be slightly rounded and more specifically toric having a large radius, for example between 20 mm and 100 mm, in order to allow it to be pressed into a groove G1, as will be seen hereinafter.

The sleeve M, illustrated in FIG. 1, is in this case symmetrical in form relative to a plane of symmetry PSM perpendicular to the longitudinal direction A of the tubes T1 and T2. It is also female/female in type.

This sleeve M comprises a central portion PCM extended on either side by two female ends EF1, EF2 (or second female tubular elements). Each female end EF1, EF2 comprises a first portion P3-1, P3-2 and two second portions P4-1, P4-2. Each first portion P3-1, P3-2 is arranged at one of the two ends of the sleeve M and is provided with a female inner thread FF, matching the male thread FM of a male end EM1, EM2.

Figure 4:
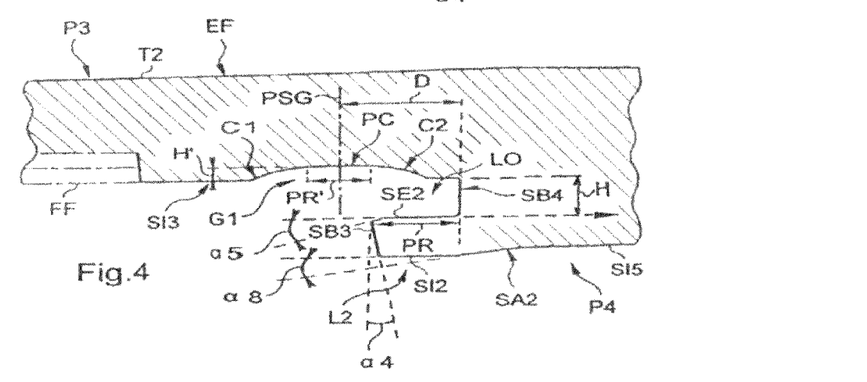
FIG. 4 illustrates schematically, in a longitudinal section, a portion of one of the two female ends of the sleeve of FIG. 1.

As is illustrated in FIG. 4, each second portion P4-1, P4-2 extends a first portion P3-1, P3-2 toward the central portion PCM. It comprises, firstly, a second annular lip (or annular finger) L2 comprising a third abutment surface SB3, a second outer surface SE2, oriented toward the exterior of the sleeve M, extending the third abutment surface SB3 in a direction opposing the first portion P3 and intended to be arranged facing a first inner surface SI1, and a second, at least partially cylindrical inner surface SI2, oriented toward the interior of the sleeve and also extending the third abutment surface SB3 in a direction opposing the first portion P3.

Each second portion P4 also comprises a fourth axial abutment surface SB4, initially substantially planar and perpendicular to the longitudinal direction A, and a third, partially cylindrical inner surface SI3, oriented toward the interior of the sleeve M and extending the fourth axial abutment surface SB4 in the direction of the first portion P3. A portion of the third inner surface SI3 defines, together with the second outer surface SE2 and fourth abutment surface SB4, an annular recess (or groove) LO matching one of the first lips L1 so as to receive it during the phase of screwing the tubes T1 and T2, to which reference will be made hereinafter.

Each recess LO extends over a selected axial length PR, equal to that of the corresponding second lip L2, and at a selected radial depth H (perpendicular to the longitudinal direction A). The PR/H ratio is preferably between approximately 1 and approximately 3 and is more preferably between approximately 1.2 and approximately 1.6. It is even more preferably equal to approximately 1.5. For example, PR is equal to 4 mm and H is equal to 2.7 mm, thus providing a PR/H ratio substantially equal to 1.5. As will be seen hereinafter, these two dimensions PR and H are selected so as to allow a selected deformation of the first lip L1.

The third abutment surface SB3, second outer surface SE2 and fourth axial abutment surface SB4 define what a person skilled in the art calls a "female rebate".

An annular groove G1 is also defined in at least a portion of each third inner surface SI3. Preferably, it initially comprises a substantially cylindrical central portion PC extended on either side by two curvilinear portions PC1 and PC2. Preferably, these curvilinear portions C1 and C2 initially have substantially identical radii of curvature, preferably between approximately 2 mm and approximately 20 mm. However, this groove G1 may comprise only two curvilinear portions.

For example, each groove G1 comprises a central portion PC extending over an axial length PR' equal to approximately 2 mm, a radial depth H' equal to approximately 1 mm, and curvilinear portions C1 and C2 having a radius of curvature equal to approximately 5 mm. The radial depth H' of the groove G1 is generally limited by the thickness of the sleeve M, in the region of the plane of symmetry PSG of said groove, which thickness must not be less than a minimum thickness used to calculate the critical section of the threaded joint. More specifically, the maximum value of the radial depth H' is selected such that the material section at the bottom of the groove G1 is greater than the product of the section of the tube T1 or T2 in its common portion (or the smaller of these two sections if they are different), and the efficiency of the joint under tension. The ratio between the critical section of the threaded elements and the section of the tube (T1, T2) characterises the efficiency of the connection (or of the joint), which is, along with the section of the tube, an item of input data for the design of a tubular string.

In this configuration, the plane of symmetry PSG of each groove G1 is arranged at a selected axial distance D from the fourth axial abutment surface SB4 which defines the bottom of the corresponding recess (or groove) LO. For example, with the aforementioned values, the distance D is equal to approximately 5.61 mm. Furthermore, after screwing, the central portion PC of the groove G1 is arranged substantially facing the added thickness SA1.

As will be seen hereinafter, the radius of curvature (in particular on the side of the thread), the radial depth H', the axial length PR and the radial depth H are selected so as to allow the selected deformation of the first lip L1 and of the zone of the second portion P2 at the root thereof.

Each second portion P4-1, P4-2 also comprises another (fifth) cylindrical inner surface SI5 extending the second abutment surface SB2 in the direction opposing the first portion P3 (i.e. in the direction of the central portion PCM of the sleeve M) and intended to be in contact with the fluid (or gas) circulating in the sleeve M.

According to the invention and as illustrated in FIG. 1, the central portion PCM of the sleeve M comprises an annular groove G2 (also referred to as a "lunula") locally defining, over an outer surface, a zone of reduced thickness centred on the plane of symmetry PSM.

This lunula G2 allows the thickness of the sleeve M to be reduced in its thickest portion and the expansion pressures and forces therefore to be reduced. It also allows the deformations to be better controlled in the region of the various abutment surfaces (SB1 to SB4) and bearing surfaces, while at the same time providing the assembly of joints with a substantially rectilinear appearance (at the outer surface generated by revolution) after expansion. The initial section of the sleeve M in the region of its plane of symmetry PSM must therefore be selected so as to be greater than or equal to the product of the section of the common portion of the tubes T1 and T2, at the ends of which are formed the first tubular elements, and the efficiency of the joint.

Preferably, the lunula extends substantially between the two third axial abutment surfaces SB3 of the two opposing second lips L1 and L2. However, it may extend over a greater distance, in particular between the last threads of the two female threads FF. The last threads are, in this case, those on the side of the third abutment surfaces SB3.

This lunula G2 may also be in the form of a dish provided with a central portion having the maximum reduced thickness (in the region of the plane of symmetry PSM) and lateral walls inclined at an angle of preferably less than approximately 30° and more preferably equal to approximately 15°.

It is important to note that the lunula (and therefore the groove G2) is not necessarily symmetrical relative to the plane PSG. It may have two dissymetrical portions either side of the plane PSG.

An assembly of joints according to the invention is formed by carrying out a method comprising the following steps.

Figure 5:
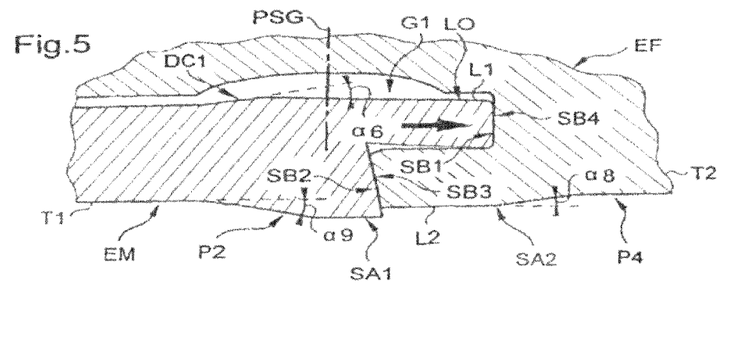
FIG. 5 illustrates schematically, in a longitudinal section, the forces generated over the male and female ends of the tube and the sleeve of FIGS. 3 and 4 during the first screwing step.

In a first step, illustrated in FIG. 5, the female end EF1 of the sleeve M is screwed to the male end EM1 of the tube T1 until the first axial abutment surface SB1 of the first lip L1 rests on the fourth axial abutment surface SB4 of the recess (or groove) LO.

In order to facilitate this screwing, and as illustrated in FIG. 4, the second outer surface SE2 of each second lip L2 may have over a short distance an inclination of a selected angle $\alpha 5$ relative to the longitudinal direction A, in the region of its connection to the third abutment surface SB3. It thus initially forms a conical surface chamfer. Preferably, this inclination is initially between an angle of approximately +8° and an angle of approximately +12°. More preferably still, it is equal to approximately 10°. An inclination of this type facilitates the penetration of the first lip L1 into the recess (or groove) LO, in particular in the case of accidental interference, thus enabling to reduce possible risks of galling or of damage to the first lip L1 and, in particular, of the end ridge of its first inner surface SI1. Such interference may occur between the first inner surface SI1 and second outer surface SE2 before the second abutment surface SB2 rests on the third abutment surface SB3.

Then, in a second step, the screwing process is continued until the second abutment surface SB2 rests on the third abutment surface SB3. The continuation of the screwing process, once the first abutment surface SB1 has been brought into abutment with the fourth abutment surface SB4, allows initiation of the storage of potential resilient energy in the first lip L1, by subjecting said first lip to axial compression.

A third step (illustrated in FIG. 6) may then possibly be provided, in which the screwing process is continued further in order radially to prestress the first lip L1 of the tube T1 in the direction of the axis of the joint. This radial prestressing may be promoted by substantially identical inclinations of the second abutment surface SB2 and third abutment surface SB3 at selected angles $\alpha 4$ relative to a plane perpendicular to the longitudinal direction A.

Preferably, as illustrated in FIGS. 3 and 4, the second SB2 and third SB3 abutment surfaces initially have convex and concave conical surfaces, respectively, and substantially equal inclinations. The term "substantially equal inclinations" refers, in the present context, to mutually equal inclinations, to within approximately ±5°. This common inclination is preferably between an angle $\alpha 4$ of approximately +5° and an angle $\alpha 4$ of approximately +30°. It is, more preferably still, equal to approximately 10°. This inclination allows sealing between the first inner surface SI1 and second outer surface SE2 prior to the expansion phase. This interference enables to provide sealing, in particular to gas, prior to the expansion phase.

An excellent seal to gases under internal pressure, including in the presence of axial tensile or compressive forces, and a good seal under external pressure, including in the presence of axial compressive forces, are thus obtained prior to expansion.

Figure 6:
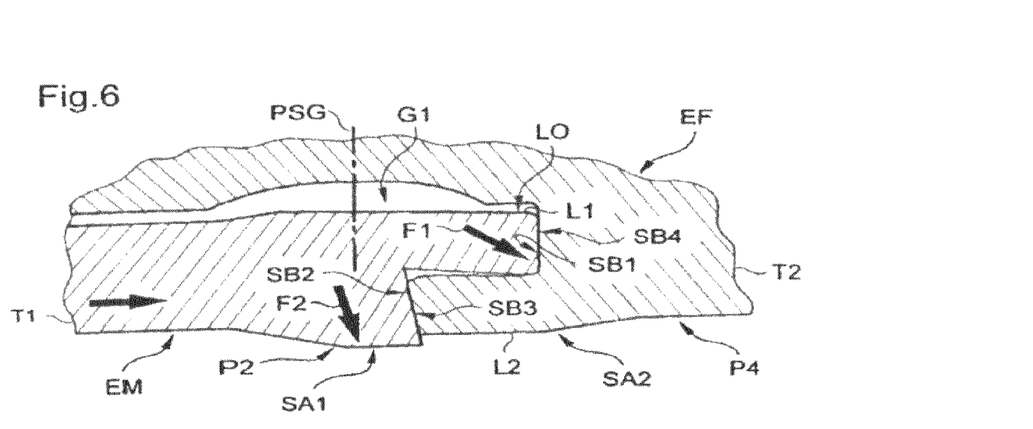
FIG. 6 illustrates schematically, in a longitudinal section, the forces generated over the male and female ends of the tube and the sleeve of FIGS. 3 and 4 during the second screwing step.

In FIG. 6, the prestresses generated are indicated by the arrows F1 and F2.

The three steps described above are then repeated by screwing the male end EM2 of the second tube T2 to the female end EF2 of the sleeve M.

Then, in a fourth step, a diametral expansion tool, such as, for example, a ball having a conical head, the maximum diameter of which is greater than the initial inner diameter DI of the tubes T1 and T2 and of the sleeve M (equal to twice the inner radius RI indicated in FIG. 1) and is substantially equal to the final inner diameter thereof, is introduced axially into the tube T2. The selection of the direction of the introduction is of no real importance, since the ball is displaced axially from one end EM (for example, EM1) to the corresponding end EF1 (EF1 in the present case), then to the other end EF and finally to the other end EM, whatever the direction of displacement of the ball.

The ball is displaced in a manner known to a person skilled in the art (see, in particular, documents U.S. Pat. No. 6,604,763 and WO 03/071086), for example by pulling by means of drill rods or else by exerting hydraulic pressure. The ball has, for example, a cylindrical/conical shape with a conical inlet portion responsible for carrying out the expansion and extended by a median cylindrical portion. However, it may also be spherical or biconical in shape (conical inlet portion extended by a cylindrical portion, itself extended by a conical outlet portion). The connecting radii of these three portions of the ball are selected as required.

Other expansion tools may be used instead of balls, such as, for example, a rotary expansion tool with three rollers providing mechanical expansion. These expansion tools (including balls) and the embodiments thereof are described, in particular, in patent documents WO 02/081863, U.S. Pat. No. 6,457,532 and US 2002/0139540.

The diametral expansion takes place in the plastic deformation region. As the plastic deformations generated increase the yield point of the tubular elements, metals able to withstand such deformations must be used. For example, for a tube initially having a yield point of 310 MPa (45 KSI), this point increases to 380 MPa (55 KSI) after expansion.

When the ball reaches the region of the fourth inner surface SI4 of the second portion P2 of the male end EM and of the fifth inner surface SI5 of the second portion P4 of the female end EF, the expanded material forces the first lip L1 to undergo deformation in the corresponding groove G1. The deformations undergone by the joint during the expansion are indicated by the arrows F3 to F6 in FIG. 7.

Figure 8:
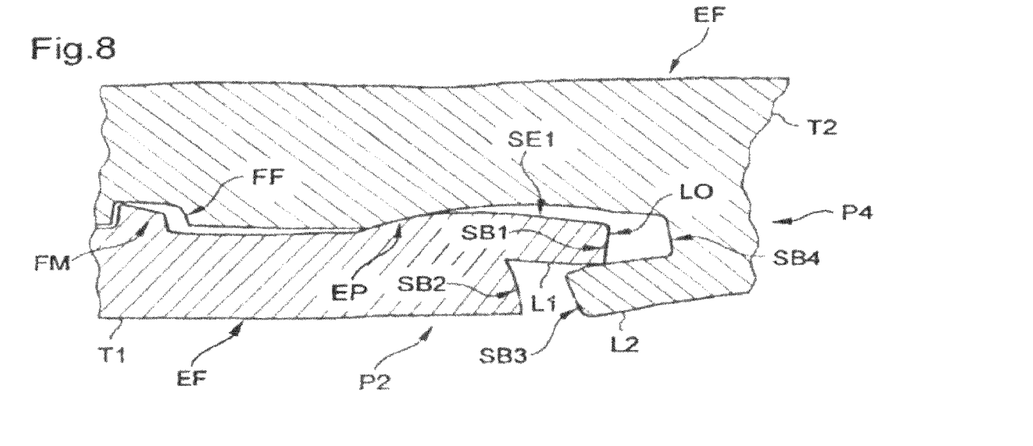
FIG. 8 illustrates schematically, in a longitudinal section, the deformations undergone by the male and female ends of the tube and the sleeve of FIGS. 3 and 4 after the expansion step.

More specifically, the first lip L1 is forced to bend (arrow F4) and to take on, at least in part, the shape of the groove G1. An annular shoulder or heel EP, allowing the formation of a zone for sealing by "metal-on-metal"-type interference contacts, is thus formed, as illustrated in FIG. 8, in the region of the first outer surface SE1 of the male end EM, just before the first lip L1.

The shoulder EP and the seal may be reinforced by the presence of a local annular added thickness SA1 in the direction of the interior of the tube T1, T2 in the region of the fourth inner surface SI4 and in the vicinity of the second abutment surface SB2. Preferably, as illustrated in FIGS. 3 and 5 to 7, this added thickness SA1 is substantially constant in the extension zone of the central portion PC of the groove G1, then it is reduced. This reduction is preferably substantially continuous in the direction of the first portion P1. It may, for example, take place at an angle $\alpha 9$ relative to the longitudinal direction A of between approximately 5° and approximately 30°, more preferably between approximately 10° and approximately 20°, and even more preferably equal to approximately 12°.

The maximum added thickness in the region of the zone of constant thickness defines a minimum inner diameter of the male element EM. This inner diameter must be greater than the diameter of an inspection tool (known to a person skilled in the art as a "drift"). The drift is a tool which is introduced inside tubes, before they are lowered into wells, in order to ensure that they have a minimum free internal diameter allowing tools to pass within the string without a risk of their becoming caught. If it remains less than the above-mentioned value, the optimal value of the added thickness is then fixed by the amount of material required to increase to the maximum the first lip L1 in the bottom of the groove G1 during the expansion so that it undergoes deformation as required. This added thickness is, for example, equal to approximately 0.8 mm.

This added thickness SA1 provides an excess of material allowing the empty space in the groove G1 to be filled and the first lip L1 and the zone located just before said first lip accordingly to take on the shape of at least a portion of said groove G1, and therefore to have substantially the desired deformation.

The deformation generates, as indicated above, the annular shoulder or heel EP, in the region of the first outer surface SE1 of the male end EM, before the first lip L1, which enables the creation of a sealed zone by interference contacts in the manner indicated hereinafter.

The expansion produced by the ball, owing to the fact that the diameter of the female element EF is greater than that of the male element EM, results in a greater rate of expansion of the male element EM than of the female element EF.

Figure 7:
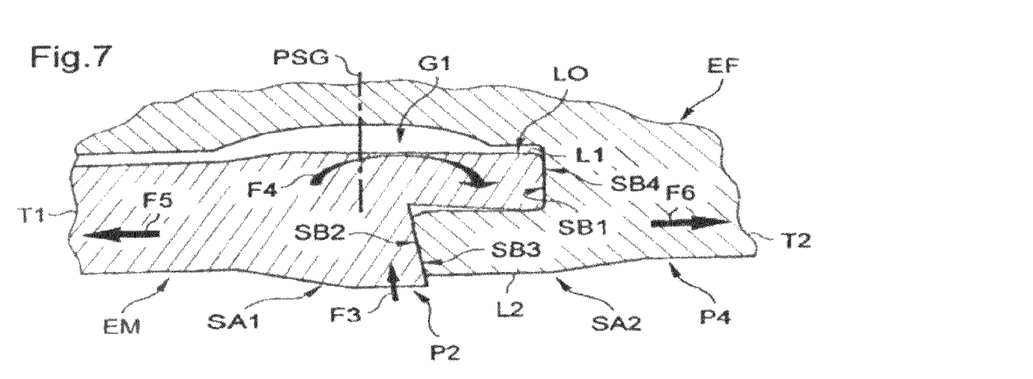
FIG. 7 illustrates schematically, in a longitudinal section, the forces generated over the male and female ends of the tube and the sleeve of FIGS. 3 and 4 during the step of expansion by plastic deformation.

Greater contraction of the male element EM than of the female element EF ensues, owing to the preservation of the material, resulting in a relative axial displacement of these two elements in the direction of a release indicated by the arrows F5 and F6 in FIG. 7. This displacement causes the inclined shoulders EP to be strongly tightened against one another, forming the desired seal. It will be noted that the contact or interference pressure is further reinforced when the joint is subjected to axial tensile stresses.

Owing to the axial disengagement during the expansion, the axial lengths of the first L1 and second L2 lips must be selected in a precise manner. If the first lip L1 is too short, there is a risk that it will leave its recess LO and therefore fall toward the axis of the joint, thus eliminating the seal after expansion. If the second lip L2 is too long, the recess LO is difficult to form.

The curvature of the first lip L1 during the expansion, promoted by the shape of the groove G1 and the added thickness SA1, results in a second interference contact between the inner portion of the end of the first lip L1 and the second outer surface SE2.

The first lip L1 is then buttressed and wedged between the shoulder formed in the wall of the groove G1 and the second outer surface SE2. A double contact of this type provides an excellent seal, stable for the various possible forms of loading, comprising both internal and external pressure combined or not with axial tensile or compressive stresses.

In order further to promote the curvature of the first lip L1 and further to reinforce the contact between the shoulder or heel EP and the groove G1, a set-back DC1 toward the interior of the tube T1, T2 may be provided, as illustrated in FIGS. 3 and 5 to 7, in the region of the first outer surface SE1 and before the first portion P1. This set-back DC1 is preferably substantially continuous. It thus initially forms a conical chamfer. It may, for example, be at an angle $\alpha 6$ relative to the longitudinal direction A of between approximately 8° and approximately 12° and is more preferably equal to approximately 10°. For example, this set-back DC1 starts at a distance from the first axial abutment surface SB1 (in the longitudinal direction A) equal to approximately 7.8 mm.

Furthermore, in order to provide material where it is required, the tubes T1 and T2 may undergo, in the region of their first P1 and second P2 portions and prior to machining of their male element EM1, EM2, a conical neck having a peak half-angle $\alpha 7$, the diameter of the cone gradually decreasing toward the free end of the male element EM1, EM2.

This neck allows the material thickness to be increased in the region of the second portion P2 and the added thickness SA1 to be accommodated. After machining of the male element EM1, EM2 and, in particular, of the added thickness SA1, the path of the neck forms a local annular set-back DC2 toward the interior of the tube, toward the free end of the male element EM1, EM2.

In order not to hinder the progress of the ball in the tubes T1 and T2, the neck is preferably substantially continuous and the angle $\alpha 7$ is between approximately 2° and approximately 20° and is more preferably equal to approximately 5°.

If the first inner surface SI1 of the first lip L1 has an inclination (for example, of approximately 2.5°), this allows the second lip L2 to be arranged in closer proximity to the exterior of the sleeve M. Accordingly, when the ball reaches the region of the second lip L2, said second lip is able to get closer to the exterior of the sleeve M. This also allows limitation of what is known as the "banana" effect, which tends to cause the second lip L2 to fall toward the interior of the cavity of the sleeve M.

This closeness may be accentuated by the presence of a local annular added thickness SA2 in the direction of the interior of the sleeve M, in the region of the second inner surface SI2 of the second lip L2 and in the vicinity of the third abutment surface SB3. Preferably, as illustrated in FIG. 4 to 7, this added thickness SA2 is substantially constant in the extension zone of the second lip L2, then it is reduced. This reduction is preferably substantially continuous. It thus initially forms a conical chamfer. It may, for example, be at an angle $\alpha 8$ relative to the longitudinal direction A of between approximately 8° and approximately 12° and is more preferably equal to approximately 10°.

This added thickness SA2 is preferably dependent on the added thickness SA1 and is preferably less than said added thickness SA1. It is, in any case, less than a maximum value defined by the size of the "drift". For example, this added thickness SA2 is between approximately 0.3 mm and 0.8 mm and is preferably equal to approximately 0.5 mm. The initial offset provided by different added thicknesses SA1 and SA2 promotes the final deformation, in particular of the first lip L1. However, this offset may not be too great, since it may cancel the aforementioned effect provided by the inclination of the first inner surface SI1 of the first lip L1 (if such inclination exists).

Once the ball has expanded the joint in the region of the connection between the tube T2 and an end of the sleeve M, it continues its axial displacement in order to expand the other joint of the assembly in the region of the connection between the sleeve M and the tube T1 (thus repeating the fourth step).

As mentioned above, the result of the expansion generated by the passing of the ball is illustrated in FIG. 8. It is important to note that in sleeved joints, the deformations of the first L1 and second lips L2 may not be completely identical at the two opposing ends of the sleeve, owing to the fact that the expansion causes axial disengagement. This difference (or dissymmetry) is, however, less than that occurring in the sleeved joints described in document FR 02/03842.

It is also important to note that the spring-back displacement of the elements of the threaded joint after the passing of the ball is negligible compared to the plastic deformations in question.

Figure 9:
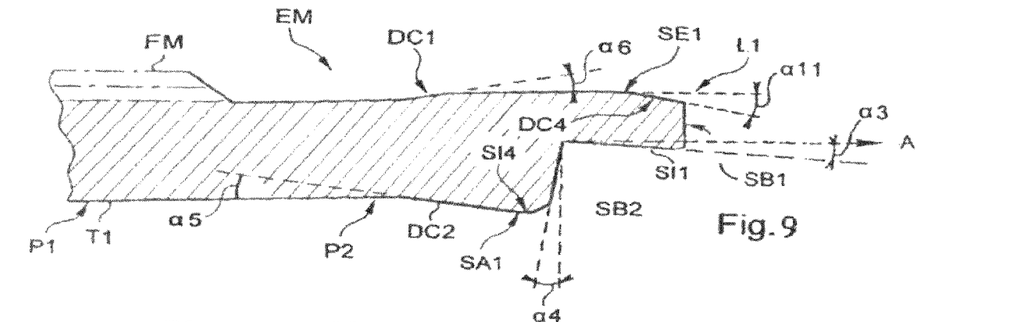
FIG. 9 illustrates schematically, in a longitudinal section, a portion of another embodiment of the male end of a first tube of an expandable threaded joint according to the invention.
Figure 10:
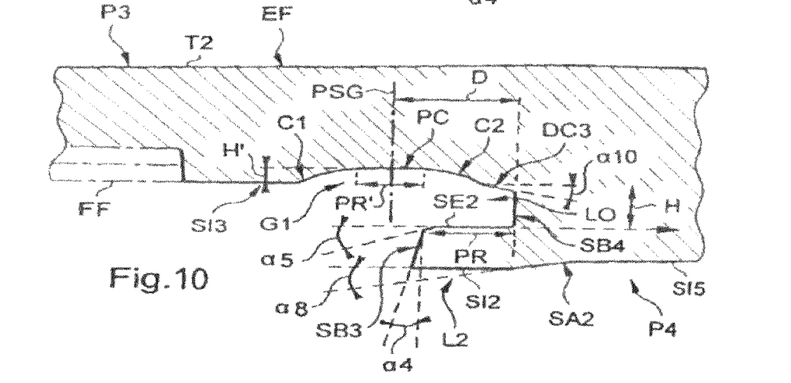
FIG. 10 illustrates schematically, in a longitudinal section, a portion of another embodiment of the female end of a second tube of an expandable threaded joint according to the invention.
Figure 11:
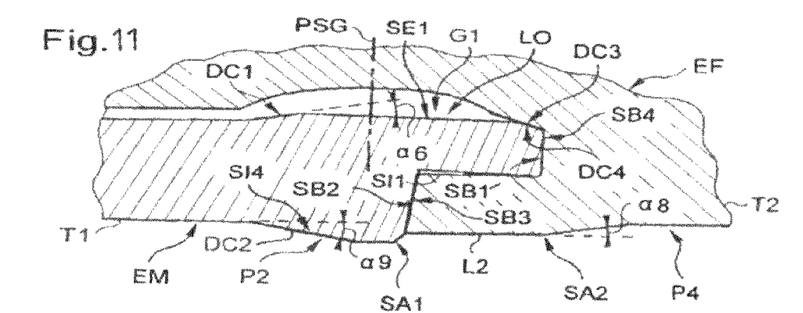
FIG. 11 illustrates schematically, in a longitudinal section, the relative positions of the male and female ends of the tubes of FIGS. 9 and 10 after the screwing phase.

Reference will now be made to FIG. 9 to 11 in order to describe another embodiment of an expandable joint according to the invention.

This embodiment has numerous similarities to that described above with reference to FIG. 1 to 8. The common elements are therefore denoted by identical reference numerals. Moreover, elements substantially identical in form and performing substantially identical functions will not be redescribed.

Furthermore, this embodiment, like the preceding one, concerns joints allowing not only the connection of the male-type end EM (or male tubular element) of a first great length tube T1, having an axis XX generated by revolution, and the female-type end EF (or female tubular element) of a second great length tube T2, also having an axis XX generated by revolution, but also the joining of two symmetrically disposed joints, described above with reference to FIG. 9, and the connection of two great length tubes T1 and T2 via a connection sleeve-type tubular element M.

The main difference between this embodiment and the preceding one is the detail of the second SB2 and third SB3 abutment surfaces and possibly also the detail of the first outer surface SE1 and third inner surface SI3 of the first EM and second EF tubular elements, which allow the first and third seals (or interference contacts) to be formed prior to expansion.

The second abutment surface SB2 and the third abutment surface SB3 still initially have conical surfaces having substantially identical selected angles of inclination $\alpha 4$ relative to a plane perpendicular to the longitudinal direction A. However, in this second embodiment, the conical surfaces of the second abutment surface SB2 and third abutment surface SB3 are concave and convex respectively.

The inclinations of the angles $\alpha 4$ are selected such that the second abutment surface SB2 rests against the third abutment surface SB3, generating the first radial and sealing interference contact of the first outer surface SE1 (of the first lip L1) against the third inner surface SI3.

Preferably, as illustrated in FIG. 9 to 11, the second SB2 and third SB3 abutment surfaces have substantially the same initial inclination. This common inclination is preferably between an angle $\alpha 4$ of approximately +5° and an angle $\alpha 4$ of approximately +30°. More preferably still, it is equal to approximately 10°.

When the second abutment surface SB2 rests against the third abutment surface SB3 during the screwing phase, the first lip L1 is forced toward the exterior of the connection. This allows the first lip L1 to be radially prestressed and its contact to the second tubular element EF in the region of the recess LO therefore to be reinforced.

Moreover, it is advantageous that the third inner surface SI3 of the second tubular element EF comprises a portion DC3, arranged between its connection to the fourth abutment surface SB4 and the second curvilinear portion C2 of the groove G1, and in which is initially defined a first sealing surface generally having an inclination of a selected angle $\alpha 10$ relative to the plane transverse to the longitudinal direction A.

This first sealing surface DC3 may possibly be defined by a third local annular set-back toward the interior of the third inner surface SI3. It may be in the form of a conical surface or a rounded surface, possibly having a toric-type portion.

The angle of inclination $\alpha 10$ of the first sealing surface (possibly of the third local annular set-back) DC3 is preferably initially between approximately +1° and approximately +30° and is more preferably equal to approximately 10°.

Furthermore, the first outer surface SE1 of the first tubular element EM comprises a terminal zone located in the region of its connection to the first abutment surface SB1 (and therefore in the region of the first lip L1) and in which is initially defined a second sealing surface generally having an inclination of a selected angle $\alpha 11$ relative to the plane transverse to the longitudinal direction A.

This second sealing surface may possibly be defined by a fourth local annular set-back toward the interior of the first outer surface SE1. It may be in the form of a conical surface or a rounded surface, possibly having a toric-type portion.

This second sealing surface DC4 is intended to be tightened radially, during the screwing phase, against the first sealing surface DC3 of the second tubular element EF.

The angle of inclination $\alpha 11$ of the second sealing surface (possibly of the fourth local annular set-back) DC4 is preferably initially between approximately +1° and approximately +30° and is more preferably equal to approximately 10°.

The angles of inclination $\alpha 10$ and $\alpha 11$ are preferably identical. However, this is not obligatory. It is, for example, conceivable that one of the first DC3 and second DC4 sealing surfaces is conical or rounded and has a non-zero inclination, whereas the other sealing surface is, for example, cylindrical and has a zero inclination.

The first DC3 and second DC4 sealing surfaces, possibly defined by the third and fourth local annular set-backs, are respectively arranged so that they may be radially tightened against one another, during the screwing phase, generating a third sealing interference contact.

Moreover, the first DC3 and second DC4 sealing surfaces may be arranged in such a way that the first sealing interference contact is generated after the third sealing interference contact. This allows the first sealing interference contact to be reinforced.

In other words, during the screwing phase, it is preferable that the first lip L1 enters firstly into contact, via the first sealing surface DC3, with the second sealing surface DC4, then that the second abutment surface SB2 rests on the third abutment surface SB3.

In this embodiment, the central portion PC of the annular groove G1 extends, for example, over an axial length PR' equal to approximately 2.2 mm, a radial depth H' equal to approximately 1 mm, and the curvilinear portions C1 and C2 have, for example, a radius of curvature equal to approximately 5.3 mm. Furthermore, the axial distance D separating the plane of symmetry PSG of the groove G1 from the fourth axial abutment surface SB4, which defines the bottom of the recess (or groove) LO, is, for example, equal to approximately 5.7 mm.

The recess LO still extends over a selected axial length PR, equal to that of the second lip L2, and at a selected radial depth H (perpendicular to the longitudinal direction A). The PR/H ratio is still preferably between approximately 1 and approximately 3, but it is in this case more preferably between approximately 1.4 and approximately 1.9 and is, more preferably still, equal to approximately 1.7. For example, PR is equal to 4.2 mm and H is equal to 2.4 mm, providing a PR/H ratio equal to approximately 1.7.

Moreover, as in the preceding embodiment, the second outer surface SE2 of the second lip L2 may have over a short distance an inclination of a selected angle α5 relative to the longitudinal direction A, in the region of its connection to the third abutment surface SB3. It thus initially forms a conical surface chamfer, the inclination of which is initially between an angle of approximately +8° and an angle of approximately +12° and is more preferably equal to approximately 10°. As indicated above, this allows the first lip L1 to penetrate the recess (or groove) LO, in particular in the case of accidental interference.

Furthermore, as in the preceding embodiment, the first inner surface SI1 of the first lip L1 is preferably inclined at a selected angle α3 relative to the longitudinal direction A of the tube T1. It thus initially forms a conical surface. The angle of inclination is still preferably between approximately 0.1° and approximately 15° and is more preferably equal to approximately 2.5°. As indicated above, this inclination allows the second lip L2 to get closer to the exterior of the tube T2 during the passing of the ball, thus limiting the banana effect.

In addition, as in the preceding embodiment, in order to promote the curvature of the first lip L1 and to reinforce the contact between the shoulder or heel EP and the groove G1, the first outer surface SE1 may comprise, just before the first portion P1, a first, preferably substantially continuous setback DC1 toward the interior of the tube T1. This first setback DC1 initially forms a conical chamfer having an angle α6 relative to the longitudinal direction A of between approximately 8° and approximately 12° and more preferably equal to approximately 10°. For example, this set-back DC1 starts at a distance from the first axial abutment surface SB1 (in the longitudinal direction A) equal to approximately 8.1 mm.

Also as in the preceding embodiment, the fourth inner surface SI4 may comprise a local annular added thickness SA1 in the direction of the interior of the tube T1, in the vicinity of the second abutment surface SB2. Preferably, as illustrated in FIGS. 9 and 11, this added thickness SA1 is substantially constant in the extension zone of the central portion PC of the groove G1, then it decreases, preferably substantially continuously, in the direction of the first portion P1. It may, for example, be at an angle α9 relative to the longitudinal direction A of between approximately 5° and approximately 30°, more preferably between approximately 10° and approximately 20°, and, more preferably still, equal to approximately 12°.

Similarly, the fifth inner surface SI5 of the second lip L2 may comprise, as in the preceding embodiment, a local annular added thickness SA2 in the direction of the interior of the tube T2, in the vicinity of the third abutment surface SB3. Preferably, as illustrated in FIGS. 10 and 11, this added thickness SA2 is substantially constant in the extension zone of the second lip L2, then it decreases preferably substantially continuously. It thus initially forms a conical chamfer. It may, for example, be at an angle α8 relative to the longitudinal direction A of between approximately 8° and approximately 12° and is more preferably equal to approximately 10°. This added thickness SA2 is preferably dependent on the added thickness SA1 and is preferably less than said added thickness SA1. For example, this added thickness SA2 is between approximately 0.3 mm and 0.8 mm and is preferably equal to approximately 0.5 mm.

The formation of an expanded joint from an expandable joint of the type described above with reference to FIG. 9 to 11 is substantially identical to that described with reference to FIG. 5 to 8.

In a first step, the end, for example the male end EM, of one of the tubes, for example T1, is screwed to the end, for example the female end EF, of the other tube, for example T2, until the second sealing surface DC4 enters into contact with the first sealing surface DC3, generating the third sealing interference contact.

In a second step, the screwing process is continued until the second abutment surface SB2 of the first lip L1 rests on the third abutment surface SB3 of the second lip L2, generating the first radial and sealing interference contact of the first outer surface SE1 against the third inner surface SI3.

In a third step, the screwing process is further continued in order radially to prestress the first lip L1, owing to the inclination (or slope) of the second SB2 and third SB3 abutment surfaces and owing to the inclination (or slope) of the first DC3 and second DC4 sealing surfaces of the recess LO and of the first lip L1, up to a specified torque level.

The contact between the inner and outer surfaces of the lip L1 and the recess LO is thus reinforced to a greater extent than in the preceding example, which enables to ensure a much stronger seal of the joint prior to the diametral expansion step.

An Excellent seal to fluids under internal pressure, for example in the presence of axial tensile or compressive forces, is thus obtained prior to expansion.

The fourth step, which consists in diametrally expanding the joint in the plastic deformation region by the axial introduction of a diametral expansion tool, such as, for example, a conical-headed ball, into one of the tubes T1 and T2, is identical to that described above.

At the end of expansion, a fourth sealing interference contact is defined between a free end of the first lip L1 (in the region of its first inner surface SI1) and the second outer surface SE2 of the second lip L2. The first lip L1 is thus wedged by its free end, owing to the fourth interference contact, and by the "heel" extending it in the region of the first outer surface SE1, owing to the second interference contact.

If the first tubular element EM comprises a first sealing surface DC3 and possibly if the second tubular element EF comprises a second sealing surface DC4, the gap in sealing performances between the upstream and downstream sides of an assembly of joints is substantially reduced once the fourth step has been completed. This results in an increase in the contact pressures on the upstream side without impairing the contact pressures on the downstream side.

Further the invention enables the deformations undergone during the expansion by the two joints of a sleeved assembly to become only slightly dissymetrical and therefore enables to provide assemblies of joints (or sleeved joints) having good, or even an excellent seal to gases under high pressure, both internal and external, both prior to and after the expansion phase, for example in the presence of high, or even very high, expansion rates, typically between 10% and 35%. Obviously, the invention also applies to expansion rates of less than 10%.

Moreover, the invention may be carried out in a wide range of steels and alloys, provided that the material has sufficient ductility to undergo expansion. In the case of steels, the material may be a non-alloy steel, or a Mn steel, or a Cr—Mo steel, or a microalloyed steel, or a boron steel, or a combination of the aforementioned compositions (Cr—Mo—Nb—B steel), or a 13% martensitic Cr steel, or a 22 or 25% chromium austeno-ferritic duplex steel, or else an austenitic stainless steel. For example, a C—Mn steel may be used for non-corrosive wells or else a 0.2% C and 13% Cr steel (X2OCr13 according to the Euronorm standard and AISI 420 according to the American standard) for corrosive wells containing $CO_2$.

Furthermore, the material may possibly be heat-treated so as to have a yield point greater than a selected value or within a range of selected values. The minimum yield point may, for example, be selected from a range extending from 300 MPa to 1,000 MPa or more.

The invention is not limited to the methods and embodiments of assemblies of sealed threaded tubular joints described above, merely by way of example, but rather encompasses all of the variations conceivable to a person skilled in the art within the following claims.

The invention claimed is:

1. An assembly of two fluid tight expandable threaded tubular joints, disposed symmetrically and each comprising:
    a first tubular element arranged at an end of a tube and comprising a first portion provided with a male thread and a second portion extending from said first portion, the first tubular element further comprising:
        i) a first outer surface,
        ii) a first annular lip having a first axial abutment surface and a first inner surface and delimited by said first outer surface over a portion of the axial length thereof,
        iii) a second abutment surface,
        iv) a first tubular element critical section defined as the annular cross-sectional area of the first tubular element, in a plane positioned normal to the axis of the element, at the largest diameter of the engaged threads; and
    a second tubular element comprising:
        i) a female thread, matching the first male thread and screwed thereto,
        ii) a second annular lip, having a third abutment surface, a second outer surface, configured to be arranged to face said first inner surface, and a second inner surface, and wherein
        iii) a third inner surface and a fourth axial abutment surface defining with the second outer surface an annular recess matching and receiving the corresponding first lip,
        iv) a second tubular element critical section defined as the annular cross-sectional area of the second tubular element, in a plane positioned normal to the axis of the element, at the smallest diameter of the engaged threads; and
    wherein
        one of said second tubular element is disposed on each of two opposing ends of a female/female connection sleeve, separated by a central portion provided with an outer annular surface, said outer annular surface having a diameter smaller than the outer diameter of the annular surface of portions of the sleeve provided with the female thread, the diameter of the outer annular surface of the central portion being selected such that the area defined as the annular cross-sectional area of the connection sleeve, in a plane positioned normal to the axis of the sleeve, in the region of this outer annular surface is greater than or equal to the smallest of the critical sections of the threaded elements of the joints, each second abutment surface rests against the corresponding third abutment surface and/or each first abutment surface rests against the corresponding fourth abutment surface,
        wherein the outer annular surface extends, axially, from an innermost end of the female thread on a first of the two opposing ends of the female/female connection sleeve to an innermost end of the female thread on a second of the two opposing ends of the female/female connection sleeve,
        wherein the assembly is configured to develop, after diametral expansion in the plastic deformation region, sealing interference contacts sealing the assembly, and the first and second tubular elements will be sealed with respect to a pressure difference between the inside and outside of the first and second tubular elements;
        wherein said second tubular element comprises, at a selected location of its third inner surface, an inner annular groove arranged substantially in the region of said first outer surface;
        wherein said first and second expandable tubular elements are shaped in such a way that, after said expansion, a sealing interference contact is defined between an inner end portion of said first lip and said second outer surface.

2. The assembly according to claim 1, wherein said outer annular surface is in the form of a dish provided with a center having a maximum reduced thickness and lateral walls inclined at an angle of less than approximately 30°.

3. The assembly according to claim 2, wherein said angle is equal to approximately 15°.

4. The assembly according to claim 2, wherein said dish extends substantially between said third abutment surfaces of the two second tubular elements.

5. The assembly according to claim 1, wherein said groove comprises at least two curvilinear portions.

6. The assembly according to claim 5, wherein the two curvilinear portions are separated by a substantially cylindrical central portion extending parallel to a longitudinal axis of the assembly.

7. The assembly according to claim 5, wherein said groove has a radial depth, the maximum value of which is selected such that the material section at the bottom of the groove is greater than the product of the smallest section of a common portion of said tubes and the efficiency of the joint under tension.

8. The assembly according to claim 5, wherein said curvilinear portions have substantially identical radii of curvature.

9. The assembly according to claim 8, wherein said radius of curvature is between approximately 2 mm and approximately 20 mm.

10. The assembly according to claim 1, wherein the assembly is configured to develop, after expansion in the plastic deformation region, sealing interference contact of the first annular lip with a portion of the groove.

11. The assembly according to claim 10, wherein the first annular lip takes on a shape of the portion of the groove after the expansion in the plastic deformation region.

12. The assembly according to claim 1, wherein said male and female threads comprise threads provided with a carrier flank having a negative angle of between approximately −3° and approximately −15°.

13. The assembly according to claim 1, wherein said male and female threads comprise threads provided with a stabbing flank having a positive angle of between approximately +10° and approximately +30°.

14. The assembly according to claim 1, wherein said male and female threads are selected from a group consisting of conical and cylindrical threads and are each formed over at least one tubular element portion.

15. The assembly according to claim 1, wherein said first outer surface and third inner surface are shaped in such a way that, after expansion, a sealing interference contact is defined between a portion of each of them.

\* \* \* \* \*